(12) United States Patent
Nobile et al.

(10) Patent No.: US 6,220,435 B1
(45) Date of Patent: Apr. 24, 2001

(54) PRESATURATED WIPER SYSTEM

(75) Inventors: David P. Nobile, Alta Loma, CA (US); Melvin D. Barutha, Greenville, SC (US)

(73) Assignee: Contec, Inc., Spartanburg, SC (US)

( * ) Notice: Subject to any disclaimer, the term of this patent is extended or adjusted under 35 U.S.C. 154(b) by 0 days.

(21) Appl. No.: 09/105,426

(22) Filed: Jun. 26, 1998

(51) Int. Cl.[7] ................................................. B65D 85/672
(52) U.S. Cl. .............................. 206/409; 206/210; 221/34
(58) Field of Search .................................. 206/207, 210, 206/233, 407, 409, 389; 221/34

(56) References Cited

U.S. PATENT DOCUMENTS

| | | | |
|---|---|---|---|
| 3,843,017 | * | 10/1974 | Harrison ................................ 206/210 |
| 3,982,659 | * | 9/1976 | Ross ...................................... 206/233 |
| 4,171,047 | * | 10/1979 | Doyle et al. .......................... 206/210 |
| 4,219,129 | * | 8/1980 | Sedgwick .............................. 206/409 |
| 4,262,816 | * | 4/1981 | Margulies ............................. 206/409 |
| 4,462,507 | * | 7/1984 | Margulies ............................. 206/409 |
| 4,535,912 | * | 8/1985 | Bonk .................................... 206/409 |
| 4,978,095 | * | 12/1990 | Phillips ................................. 206/233 |
| 5,029,701 | * | 7/1991 | Roth et al. ........................... 206/232 |
| 5,467,893 | * | 11/1995 | Landis, II et al. .................... 206/409 |
| 5,595,786 | * | 1/1997 | McBride, Jr. et al. ............... 206/233 |
| 5,803,249 | * | 9/1998 | Harsanyi, Jr. et al. ............... 206/233 |

* cited by examiner

*Primary Examiner*—Paul T. Sewell
*Assistant Examiner*—J. Mohandesi
(74) *Attorney, Agent, or Firm*—Bryan Cave LLP

(57) ABSTRACT

A system for dispensing presaturated wiper sheets for use in various industrial and manufacturing situations includes a reusable dispenser canister and at least one refill package of wiper sheets. The dispensing canister may include a receptacle base, and a lid threaded onto the base. A gasket, such as an annular disc of compressible foam material, may be interposed between the base and lid. The lid includes an integral cap unit which defines a storage well and a cap element. An aperture, through which a portion of the leading sheet extends, is defined in a bottom portion of the storage well. The well is preferably deep enough so that the wiper portion can be relatively long, without interfering with closing of the cap element. The cap unit is designed to provide a relatively tight seal when the cap element is closed. A lip protrudes up at an acute angle from a main cap portion of the cap element to facilitate opening of the cap element, even by a gloved worker.

7 Claims, 12 Drawing Sheets

10

12

PRESATURATED WIPER SYSTEM

BACKGROUND OF THE INVENTION

The present invention relates generally to presaturated wiper products utilized in various industrial and manufacturing situations. More particularly, the present invention relates to improvements in the storage and dispensing of presaturated wiper sheets.

Presaturated wiper sheets are beginning to enjoy more widespread usage in many industrial and manufacturing situations. Often, tasks that were previously performed using loose rags and separately stored can now be performed more economically using a presaturated wiper system. For example, each of the presaturated wipers will carry a more optimized amount of solvent than a loose rag saturated with separate solvent, thus leading to less solvent waste.

In the past, wiper systems have been provided in which a reusable wiper dispenser can be refilled with a fresh supply of wiper sheets when a previous supply has been exhausted. One such system uses a tub having a base and a removable lid. Refill wiper rolls are maintained in a foil package until use. The rolls are configured as a continuous length of wiper sheets connected together by perforations, thus permitting individual sheets to be separated when desired. After the roll is placed in the dispenser, sheets are removed by pulling them through an aperture in the lid. The lid includes a cap element that may be closed to cover the aperture between pulls, i.e., times when a sheet is being withdrawn.

While this prior art system works generally well for its intended purpose, some room for improvement exists. For example, the lid aperture of the prior art system is relatively shallow. As such, the portion of the leading sheet extending through the aperture between pulls must be very short. For example, a longer portion may undesirably interfere with closing of the cap element. A short portion, however, can be difficult to grasp by an industrial worker, particularly if the worker is wearing glove. In addition, a gloved worker may find it difficult to open the cap element when desired.

SUMMARY OF THE INVENTION

The present invention recognizes various disadvantages of prior art constructions and methods. Accordingly, it is an object of the present invention to provide a presaturated wiper assembly having one or more novel features.

It is a further object of the present invention to provide a presaturated wiper assembly adapted for ease of use in a manufacturing environment.

It is a particular object of the present invention to provide a presaturated wiper assembly which may be easily opened by an industrial worker.

It is also a particular object of the present invention to provide a presaturated wiper assembly which inhibits undesired solvent escape.

It is also an object of the present invention to provide an improved presaturated wiper dispensing system.

Some of these objects are achieved by a presaturated wiper assembly comprising a plurality of wiper sheets presaturated with a predetermined solvent. The wiper sheets are connected together in a continuous length such that individual sheets thereof can be pulled apart from the continuous length by a user. A container is also provided, having a base and a lid attached to the base. The base defines a receptacle containing the plurality of wiper sheets. The lid defines an aperture having a portion of a leading wiper sheet in the continuous length extending therethrough. The lid further includes a cap element having a main cap portion closeable to cover the aperture. The cap element also includes a protruding lip extending upwardly therefrom to facilitate opening of the cap element to expose the portion of the leading wiper sheet.

In some exemplary embodiments, the cap element includes a hinge located opposite to the protruding lip across the main cap portion. The protruding lip preferably extends up from the main cap portion at an acute angle. Generally, the aperture will be defined in a bottom portion of a lid well. Often, the main cap portion of the cap element may carry a depending seal ring engaging an inner surface of the lid well to provide a seal when the main cap portion is closed. The cap element and the lid well may be constructed as an integral unit fixedly attached to the lid.

Other objects of the present invention are achieved by a presaturated wiper assembly comprising a plurality of wiper sheets presaturated with a predetermined solvent. The wiper sheets are connected together in a continuous length such that individual sheets thereof can be pulled apart from the continuous length by a user. A container is also provided, having a base and a lid attached to the base. The base defines a receptacle containing the plurality of wiper sheets. The lid defines an aperture having a portion of a leading wiper sheet in the continuous length extending therethrough. The lid further includes a cap element having a main cap portion closeable to cover the aperture and openable to expose the portion of the leading wiper sheet. An annular gasket is interposed between the base and the lid.

In some exemplary embodiments, the gasket is formed as an annular disc of a compressible gasket material. For example, the compressible gasket material may be a foam material. Often, the lid of the container will threadingly engage the base.

Still further objects of the present invention are achieved by a presaturated wiper assembly comprising a plurality of wiper sheets presaturated with a predetermined solvent. The wiper sheets are connected together in a continuous length such that individual sheets thereof can be pulled apart from the continuous length by a user. A container is also provided, having a base and a lid attached to the base. The base defines a receptacle containing the plurality of wiper sheets. The lid has a lid well defining an aperture having a portion of a leading wiper sheet in the continuous length extending therethrough. The lid further includes a cap element having a main cap portion closeable to cover the aperture and openable to expose the portion of the leading wiper sheet. The main cap portion of the cap element carries a depending seal ring engaging an inner surface of the lid well to provide a seal when the main cap portion is closed.

Additional objects of the present invention are achieved by a wiper assembly comprising a container having a plurality of wiper sheets located therein. An integral cap unit is fixedly attached to the container and has a well defining an aperture in a bottom portion thereof. The aperture is configured to permit a respective wiper sheet to be pulled through from inside of the container. The cap unit further includes a cap element having a main cap portion closeable to cover the aperture. A protruding lip extends upwardly from the cap unit to facilitate opening of the cap element for allowing access to the respective wiper sheet.

Still further objects of the present invention are achieved by a presaturated wiper dispensing system comprising a reusable container for containing a roll of presaturated wiper sheets. The reusable container has a lid defining an aperture through which respective of the wiper sheets will be pulled in use. A refill package is also provided, containing the roll of presaturated wiper sheets. An endmost sheet in the roll has a leader element extending therefrom to facilitate threading of the endmost sheet through the aperture by a user. Preferably, the leader element may comprise an elongate plastic member attached to the endmost sheet.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
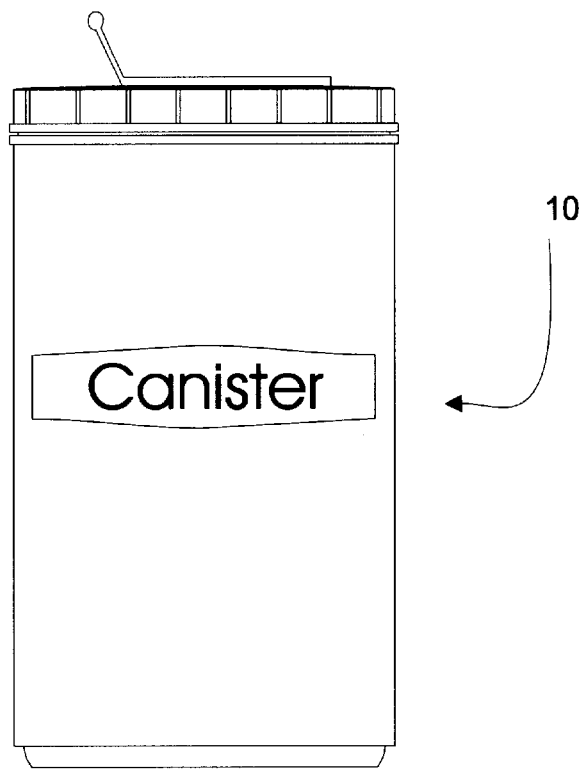
FIG. 1 is an elevational view showing components of a presaturated wiper dispensing system in accordance with the present invention.
Figure 1:
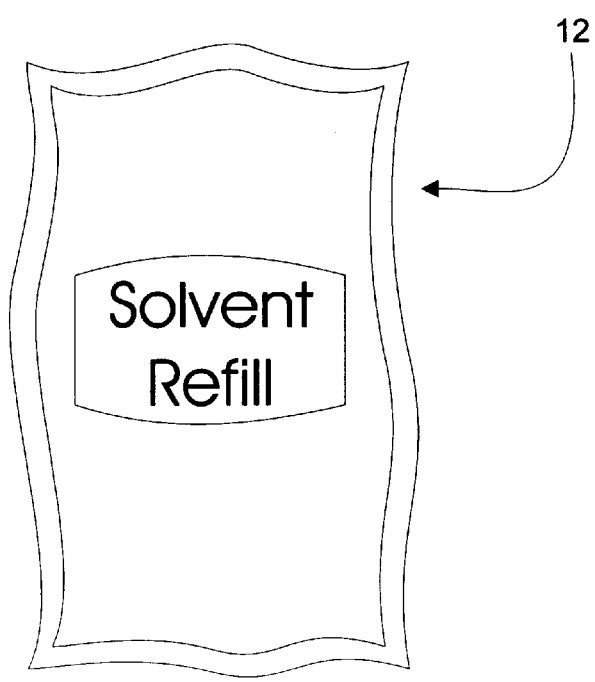

Repeat use of reference characters in the present specification and drawings is intended to represent same or analogous features or elements of the invention.

DETAILED DESCRIPTION OF PREFERRED EMBODIMENTS

It is to be understood by one of skill in the art that the present discussion is a description of exemplary embodiments only, and is not intended as limiting the broader aspects of the present invention, which broader aspects are embodied in the exemplary constructions.

FIG. 1 illustrates components of a presaturated wiper dispensing system in accordance with the present invention. Generally, the system comprises a reusable container, here in the form of a canister 10, from which the wiper sheets are dispensed. Often, canister 10 will be made from HDPE or other suitable plastic material. A refill package 12 of presaturated wiper sheets is also provided to replenish canister 10 when a previous supply has been exhausted.

Figure 2:
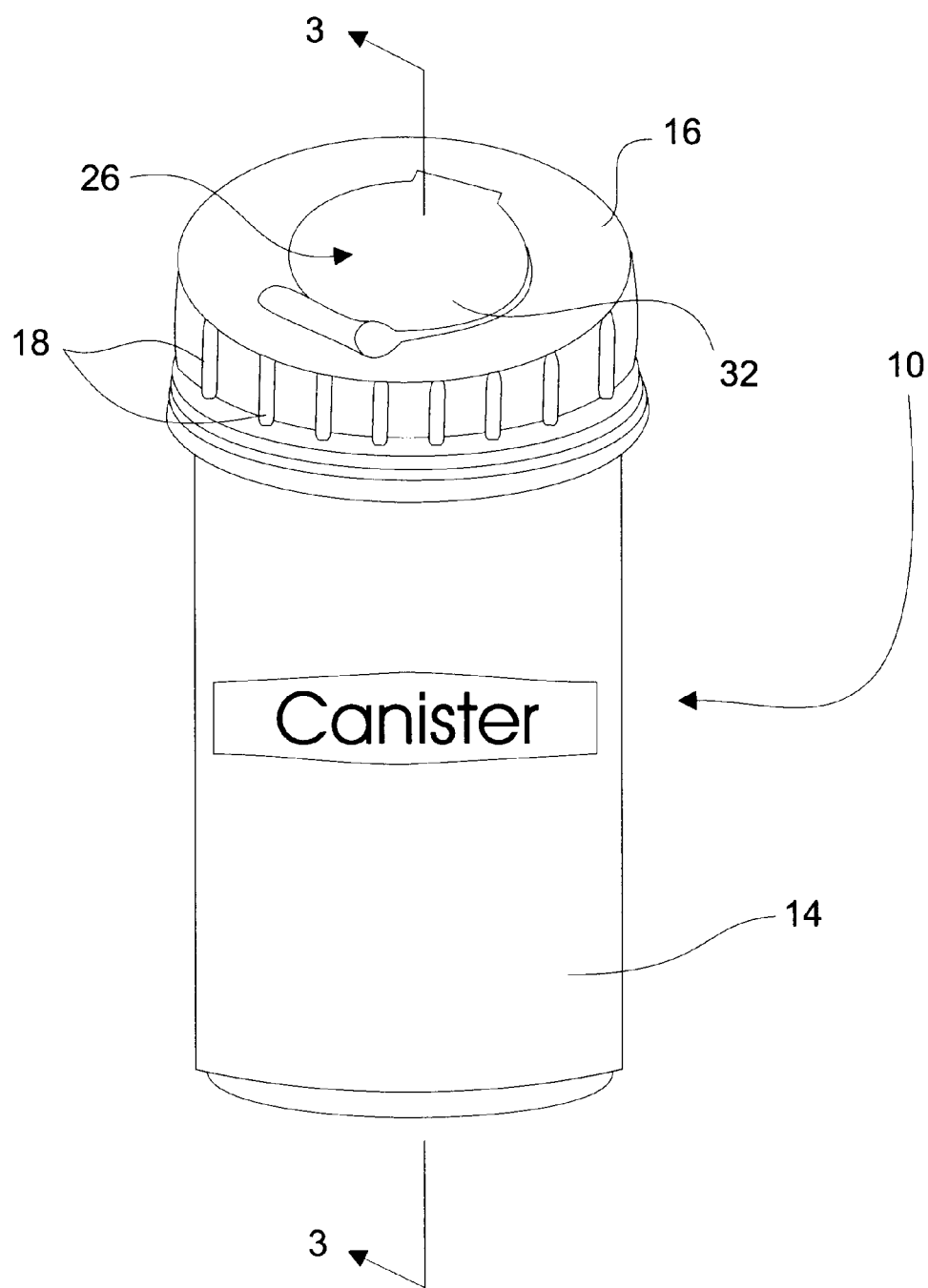
FIG. 2 is a perspective view of a canister for containing a roll of presaturated wiper sheets in the system of FIG. 1.
Figure 3:
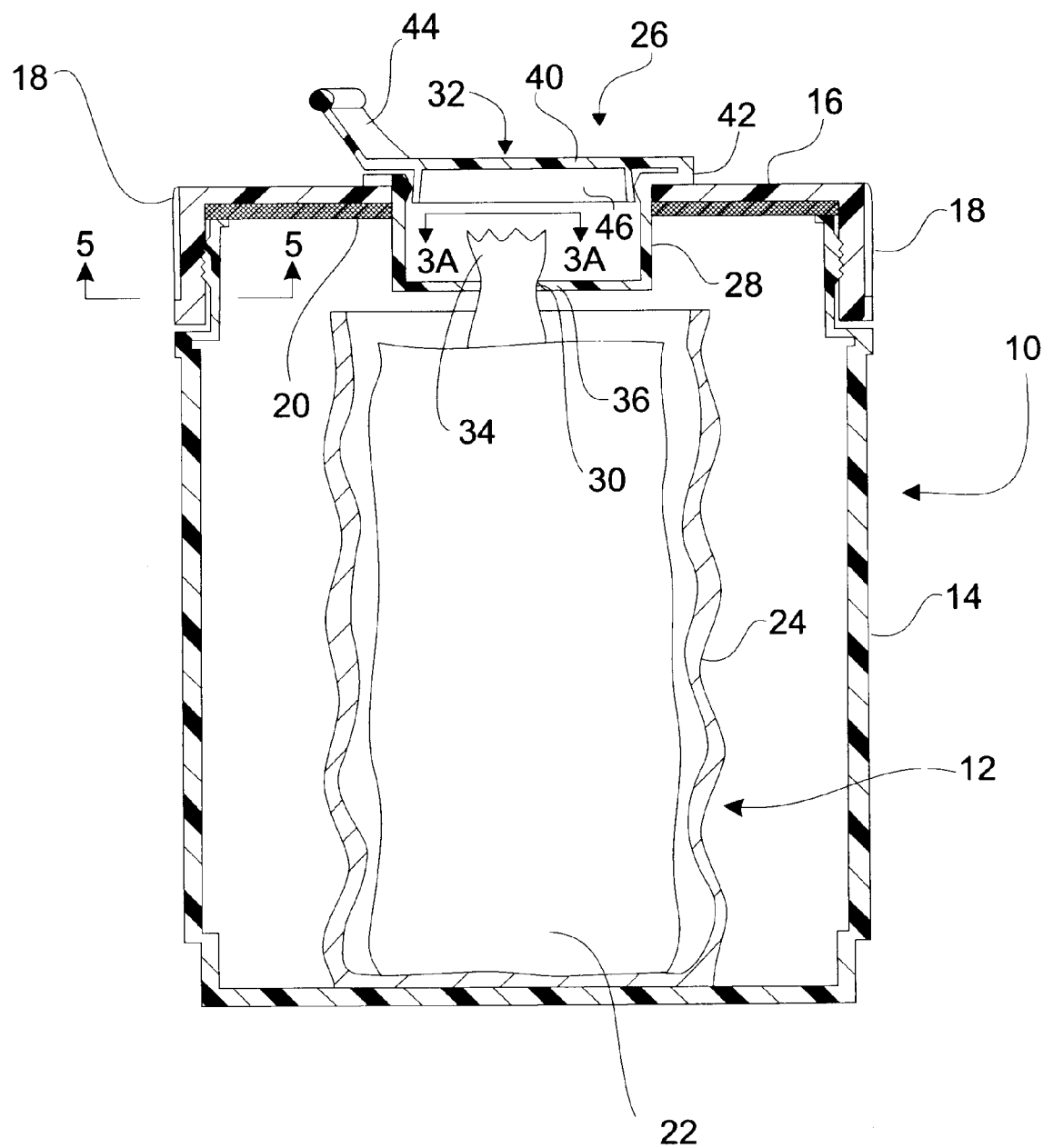
FIG. 3 is a cross-sectional view as taken along line 3—3 of FIG. 2.

Further details of canister 10 will now be described with reference to FIGS. 2 and 3. As can be seen, canister 10 generally includes a base 14 to which a removable lid 16 is attached. In the illustrated embodiment, lid 16 is threaded onto base 14 so that a relatively tight engagement can be achieved. A series of knurls 18 may be provided about the periphery of lid 16 to facilitate gripping as the lid is threaded onto base 14. A gasket 20 (FIG. 3) is preferably interposed between base 14 and lid 16 to minimize drying, and the escape of solvent fumes. Preferably, gasket 20 will comprise an annular disc of compressible gasket material, such as a suitable foam material.

Base 14 is sized to receive a roll 22 of wiper sheets therein. The roll comprises a plurality of wiper sheets connected together in a continuous length such that individual wiper sheets can be pulled apart by a user. For example, roll 22 may be formed of a nonwoven textile material in which the individual wiper sheets are separated by perforations. Although various synthetic materials are believed to be suitable for this purpose, some exemplary embodiments utilize a spun-bonded polyrayon, 100% rayon or other natural fiber/synthetic fiber blends. Preferably, only high-quality web materials will be used, with very low levels of lint and other deleterious components. For ease of use, roll 22 may be placed into base 14 while still being located inside of the pouch 24 of package 12. Of course, pouch 24 is opened by the user so that roll 22 will be exposed.

As can be seen, an integral cap unit 26 is fixedly attached to lid 16. Cap unit 26 includes a well 28 defining an aperture 30 in a bottom portion thereof. In exemplary embodiments, the internal depth of well 28 will be approximately 0.3 inches or more. Cap unit 26 further includes a cap element 32 which may be closed to cover aperture 30, or opened when a wiper sheet is to be dispensed.

Figure 3A:
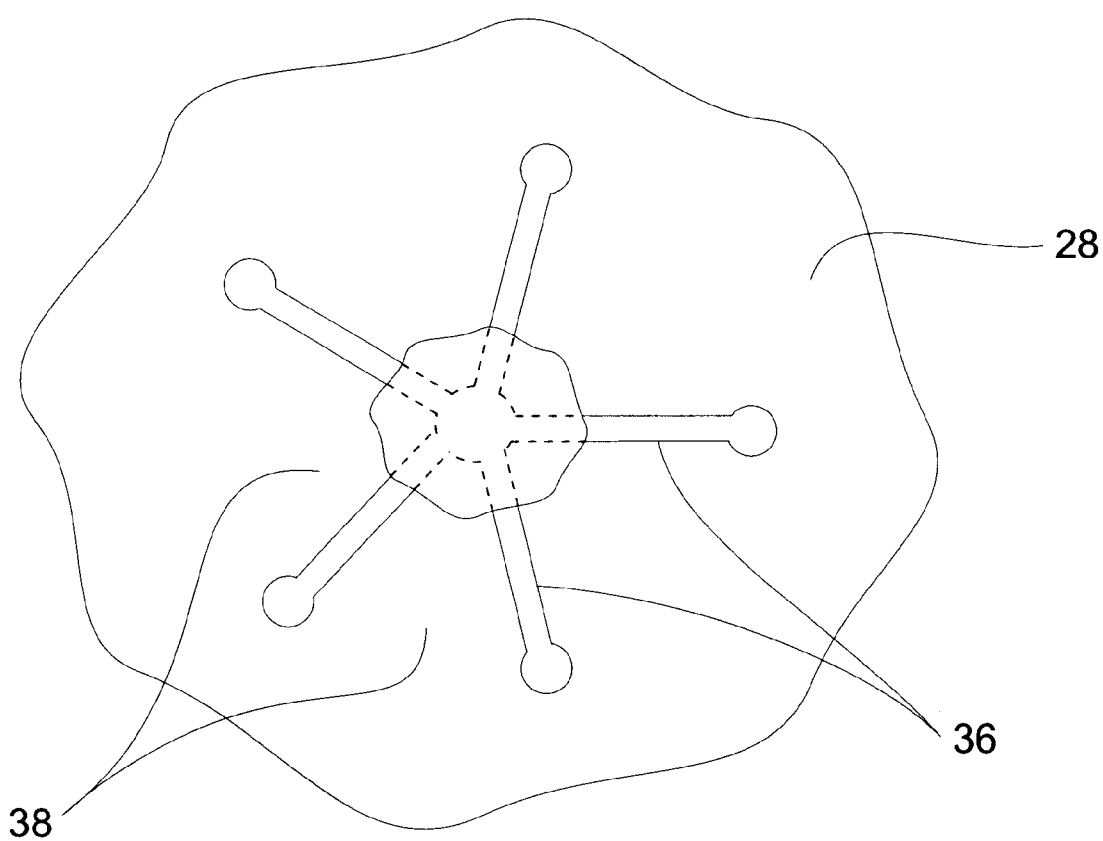
FIG. 3A is an enlarged fragmentary view as taken along line 3A—3A of FIG. 3.

Roll 22 is preferably coreless, and may be configured such that wiper sheets are dispensed from the interior of the roll. Toward this end, a user obtains wiper sheets by pulling a portion 34 of the leading wiper that extends through aperture 30. As shown most clearly in FIG. 3A, a series of star cuts 36 extend out from aperture 30 to form compliant beams 38 therebetween. Beams 38 serve to grip wiper portion 34 while simultaneously providing flexibility as the wiper sheets are dispensed.

Figure 4A:
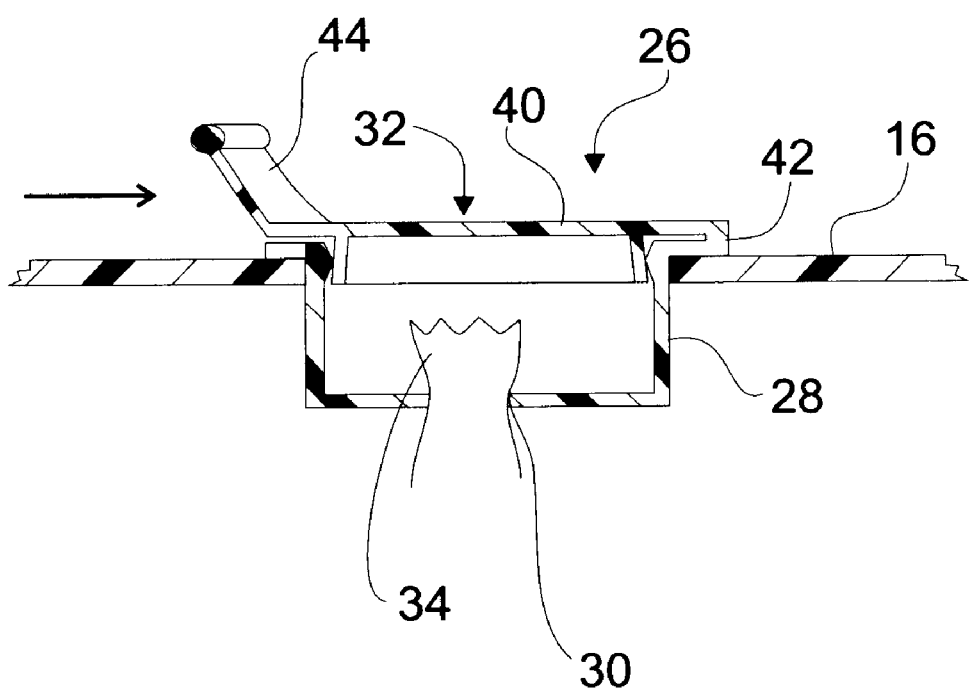
FIGS. 4A through 4C are enlarged views illustrating the manner in which the closeable cap element of the canister of FIG. 2 is opened to allow access to a wiper sheet.
Figure 4B:
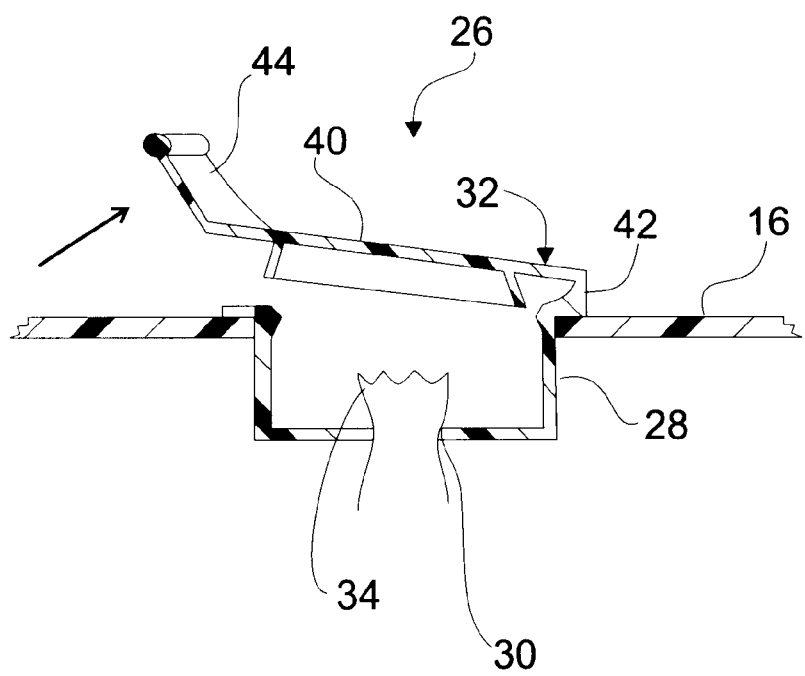
Figure 4C:
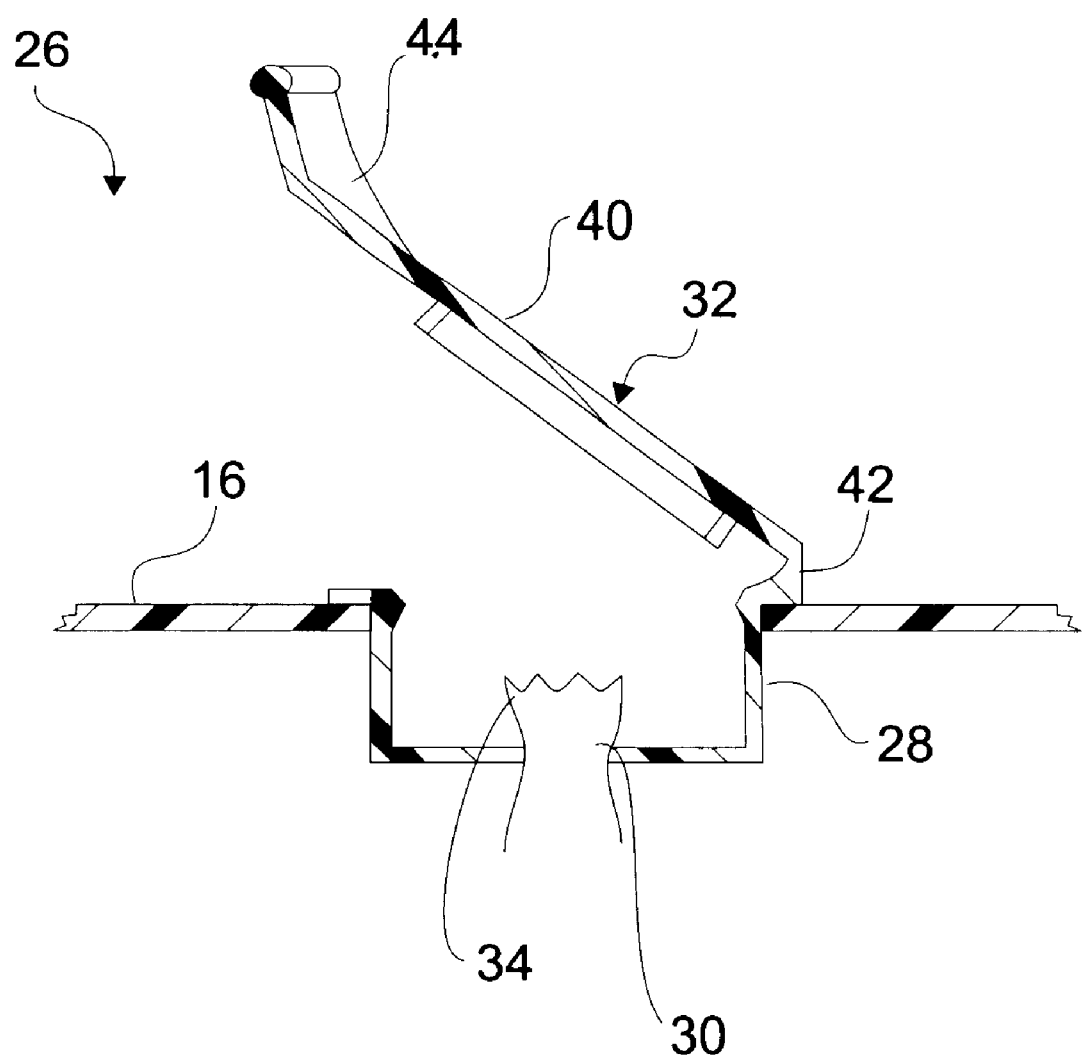
Figure 5:
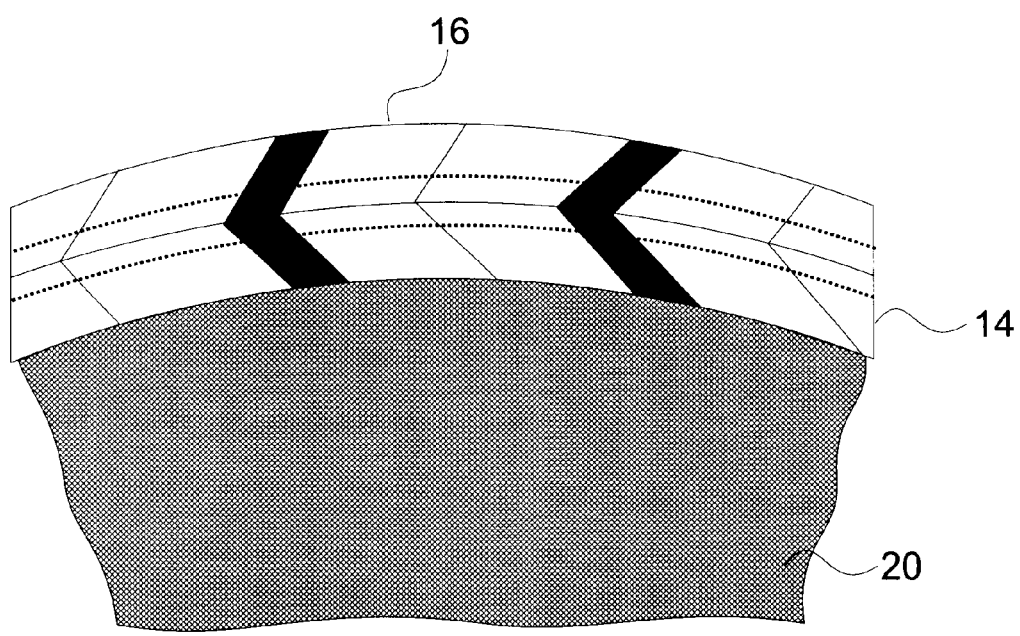
FIG. 5 is an enlarged fragmentary view taken along line 5—5 of FIG. 3.

Referring now also to FIGS. 4A through 4C, cap element 32 includes main cap portion 40 having a hinge 42 and a protruding lip 44 located on respective opposite sides thereof. As shown, protruding lip 44 preferably extends up from main cap portion 44 at an acute angle. Due to its configuration, protruding lip 44 facilitates opening of cap element 32 by an industrial worker, even when the worker is wearing gloves. The worker can open cap element 32 by simply pushing against lip 44, without the need to grasp a small tab or the like. The relatively deep well also facilitates use by a gloved worker, since wiper portion 34 can be longer than would otherwise be the case.

Figure 6:
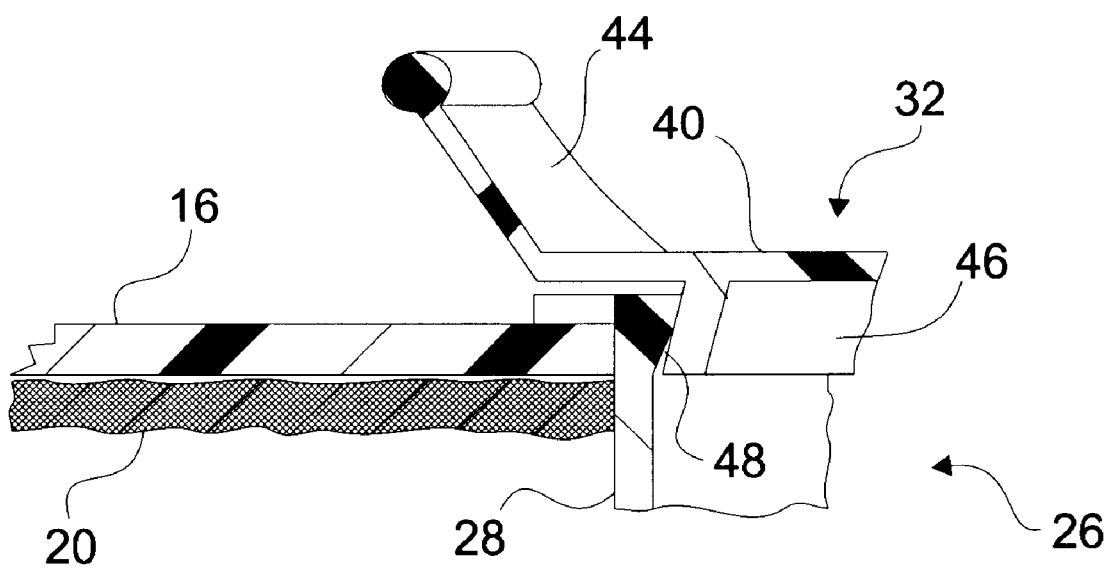
FIG. 6 is an enlarged cross-sectional view of the seal provided at the cap element of the canister of FIG. 3.

Referring now to FIG. 6, cap unit 26 preferably also provides a relatively tight seal when cap element 32 is closed. In the exemplary embodiment, the seal comprises an annular seal ring 46 which integrally depends from the bottom of main cap portion 40. The seal is formed when seal ring 46 engages an annular protrusion 48 defined about the upper inside surface of well 28. As shown, protrusion 48 may define a pair of sloped surfaces which converge to an apex.

Figure 7:
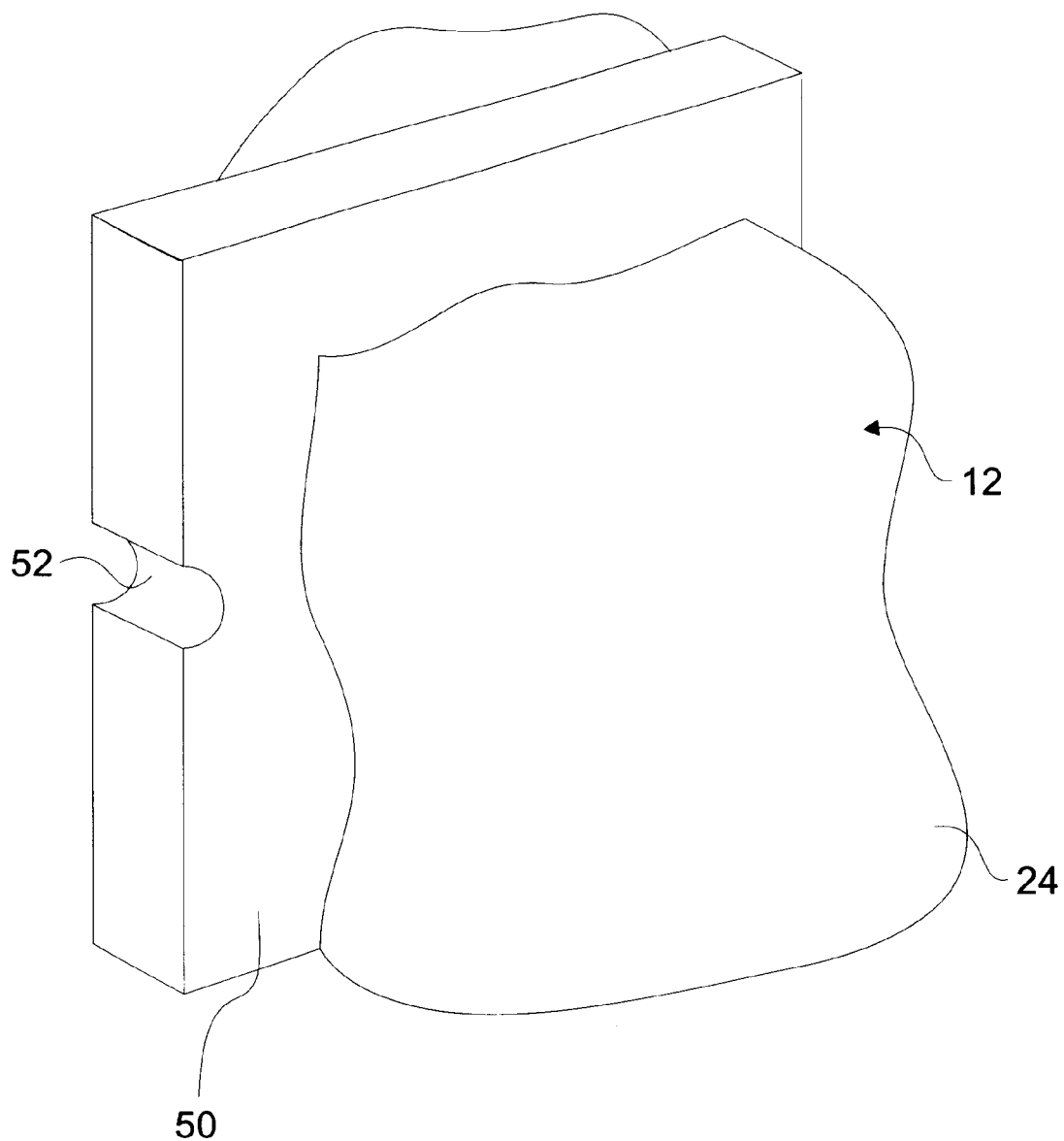
FIG. 7 is an enlarged perspective view showing a portion of the foil pouch in which refill rolls are contained.

FIG. 7 illustrates a portion of the pouch 24 of refill package 12. In presently preferred embodiments, pouch 24 is formed as two planar sheets joined together about their respective peripheries to form a fin 50. Fin 50 may be notched in one or more places, as indicated at 52, to facilitate tearing when it is desired to open the package. In exemplary embodiments, pouch 24 is made of a foil material to maintain the roll of wiper sheets in its saturated state without degradation. It should be appreciated, however, that other suitable pouch materials may also be used.

Figure 8:
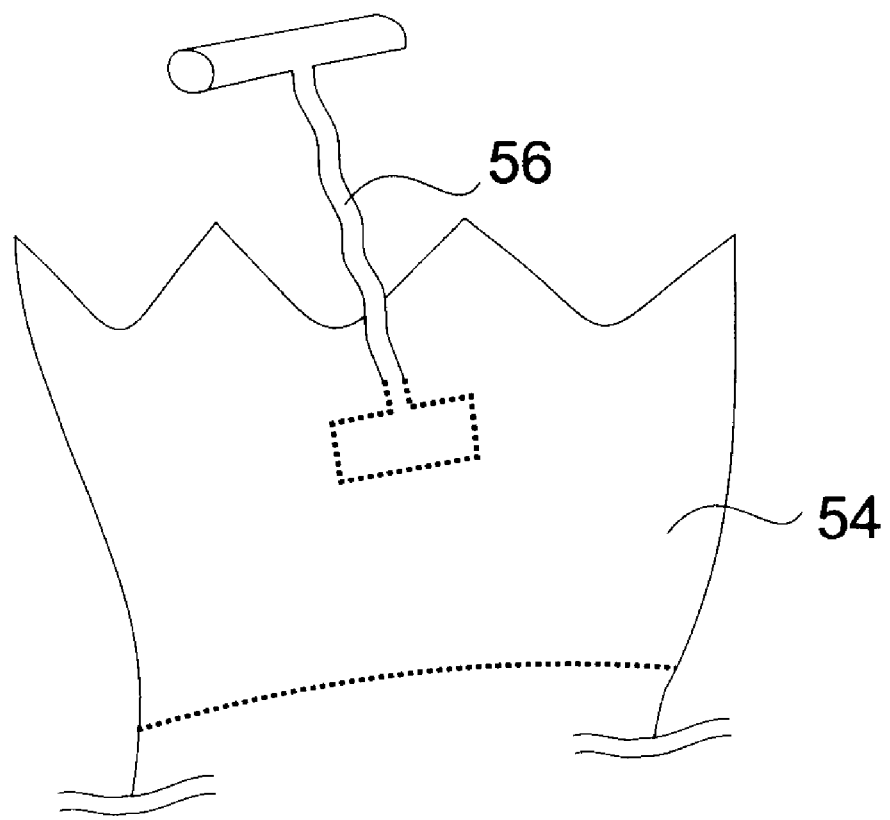
FIG. 8 is an enlarged perspective view of a leader element used in the refill roll to facilitate threading of the endmost sheet through the lid aperture of the canister.

Referring now to FIG. 8, the endmost sheet 54 in a refill roll is preferably equipped with a suitable leader element 56. As shown, leader element 56 may be an elongate plastic member, such as the type frequently utilized to attach tags to articles of clothing. Leader element 56 is easily grasped by an industrial worker, and facilitates threading of the refill roll through the pull-thru aperture of the canister lid.

Figure 9:
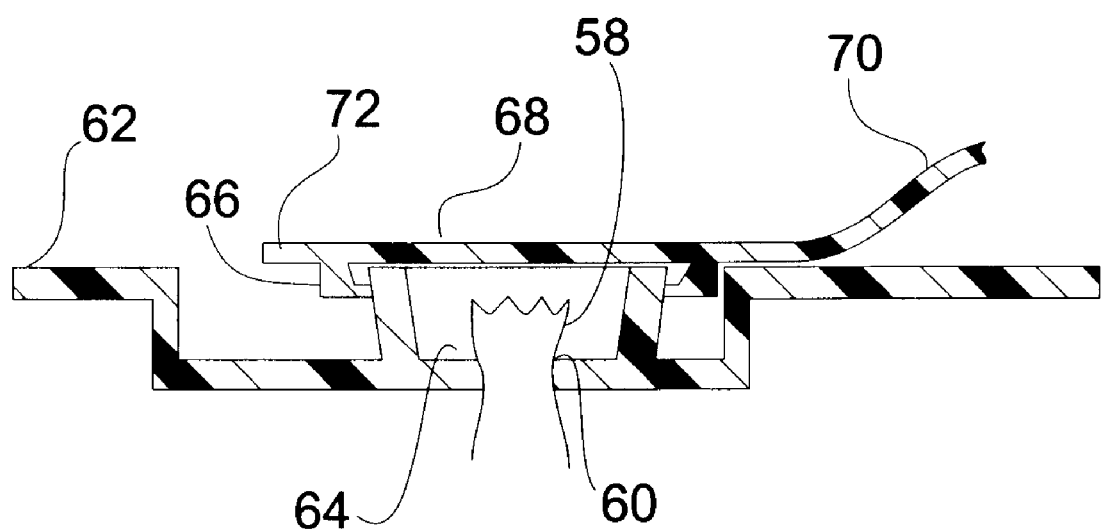
FIG. 9 is an enlarged cross-sectional view showing the cap portion of a lid in a prior art canister.

For purposes of comparison, FIG. 9 illustrates one lid arrangement used in a reusable roll canister of the prior art. As can be seen, a portion 58 of a leading sheet in a roll of presaturated wipers extends through an aperture 60 (which may include radial star cuts) in the center of a shallow well. The shallow well is integrally defined in a lid 62 of the canister. An upstanding seal ring 64 surrounds aperture 60 for engaging a depending seal ring 66 of cap element 68. Cap element 68 is attached to an integral leash 70 to prevent it from separating from lid 62 when the well is opened. A tab 72 is provided to facilitate opening of cap element 68 by a user.

It can be seen that the present invention provides various novel features in a system for dispensing presaturated wiper sheets. As will be appreciated, the particular solvent utilized may vary depending on the desired end use. Toward this end, the invention has been found to be particularly useful for general cleaning and surface preparation in the aerospace industry. For example, the presaturated wiper system of the present invention may be used for seal preparation. Sealing is done extensively to prevent corrosion of joints and other features like screw and bolt sites, rivets, etc., and to seal fuel tanks to prevent leakage.

Presaturated wipers provide the correct amount of solvent, preventing excess solvent from remaining in a seal joint. This is in contrast to hand wiping with separate rags and solvent, where the wiping cloth is often saturated above its capacity to hold the solvent. The remaining solvent could inhibit seal bonding which may lead to insufficient sealing of the joint/feature.

Typical solvents in aerospace applications may include solvents or solvent blends with vapor pressures of 50 mm Hg or less. The solvents are preferably filtered to remove impurities, such as those having a size of two microns and larger. Wiper saturation levels of between 50% and 100% are frequently desirable in various embodiments of the present invention.

One of skill in the art will appreciate that variations and modifications may be made without departing from the invention. For example, it may be desirable in some embodiments to utilize woven or knit fabrics, particularly embodiments using a stack of wiper sheets instead of a connected length as described above. In addition, aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A presaturated wiper assembly comprising:

a plurality of wiper sheets connected together in a continuous length such that individual sheets thereof can be pulled apart from said continuous length by a user, said wiper sheets being presaturated with a predetermined solvent;

a container having a base and a lid attached to said base;

said base defining a receptacle containing said plurality of wiper sheets;

said lid defining an aperture having a portion of a leading wiper sheet in said continuous length extending therethrough, said lid further including a cap element having a main cap portion closeable to cover said aperture and openable to expose said portion of said leading wiper sheet; and an annular gasket interposed between said base and said lid, wherein said aperture is defined in a bottom portion of a lid well, said cap element and said lid well being constructed as an integral unit fixedly attached to said lid, wherein said main cap portion of said cap element has a hinge and a protruding lip located on opposite sides thereof, and wherein said main cap portion carries a depending seal ring, said seal ring engaging an annular protrusion defining a pair of sloped surfaces converging to an apex on said inner surface of said lid well to provide a seal when said main cap portion is closed.

2. A presaturated wiper assembly comprising:

a plurality of wiper sheets connected together in a continuous length such that individual sheets thereof can be pulled apart from said continuous length by a user, said wiper sheets being presaturated with a predetermined solvent;

a container having a base and a lid attached to said base;

said base defining a receptacle containing said plurality of wiper sheets;

said lid having a lid well defining an aperture having a portion of a leading wiper sheet in said continuous length extending therethrough;

said lid further including a cap element having a main cap portion closeable to cover said aperture and openable to expose said portion of said leading wiper sheet; and said main cap portion of said cap element carrying a depending seal ring, said seal ring engaging an annular protrusion defining a pair of sloped surfaces converging to an apex on said inner surface of said lid well to provide a seal when said main cap portion is closed.

3. A presaturated wiper assembly as set forth in claim 2, wherein said main cap portion has a hinge and a protruding lip located on opposite sides thereof.

4. A presaturated wiper assembly as set forth in claim 3, wherein said protruding lip extends up from said cap element at an acute angle.

5. A presaturated wiper assembly as set forth in claim 2, wherein said cap element and said lid well are constructed as an integral unit fixedly attached to said lid.

6. A presaturated wiper assembly as set forth in claim 5, wherein said lid well has a depth of at least approximately 0.3 inch.

7. A presaturated wiper assembly as set forth in claim 2, further comprising a gasket interposed between said base and said lid.

* * * * *